(12) United States Patent
Sambhwani et al.

(10) Patent No.: US 8,064,424 B2
(45) Date of Patent: Nov. 22, 2011

(54) SDMA FOR WCDMA

(75) Inventors: Sharad Deepak Sambhwani, San Diego, CA (US); Dhananjay Ashok Gore, San Diego, CA (US); Avneesh Agrawal, San Diego, CA (US); Arak Sutivong, Bangkok (TH); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 663 days.

(21) Appl. No.: 11/213,463

(22) Filed: Aug. 26, 2005

(65) Prior Publication Data

US 2007/0019535 A1 Jan. 25, 2007

Related U.S. Application Data

(60) Provisional application No. 60/702,018, filed on Jul. 22, 2005, provisional application No. 60/708,230, filed on Aug. 9, 2005.

(51) Int. Cl.
*H04B 7/216* (2006.01)

(52) U.S. Cl. ........ 370/342; 370/203; 370/208; 370/209; 370/320; 370/329; 370/335; 370/341; 370/441; 455/447; 455/450; 455/451; 455/452.1; 455/453

(58) Field of Classification Search .......... 370/370, 370/320, 335, 342, 441, 208, 209, 329, 328, 370/337, 347, 203, 341; 455/447, 450, 453, 455/456.1, 451, 452.1, 452.2, 446, 509
See application file for complete search history.

(56) References Cited

U.S. PATENT DOCUMENTS

| 6,134,215 | A | 10/2000 | Agrawal et al. | |
|---|---|---|---|---|
| 6,388,998 | B1 * | 5/2002 | Kasturia | 370/320 |
| 6,396,822 | B1 * | 5/2002 | Sun et al. | 370/335 |
| 6,473,395 | B1 * | 10/2002 | Lee | 370/209 |
| 6,570,889 | B1 | 5/2003 | Stirling-Gallacher et al. | |
| 6,741,582 | B1 * | 5/2004 | Mansour | 370/342 |
| 6,904,283 | B2 * | 6/2005 | Li et al. | 455/450 |
| 6,996,056 | B2 * | 2/2006 | Chheda et al. | 370/209 |
| 7,272,110 | B2 * | 9/2007 | Lee et al. | 370/209 |
| 7,408,974 | B2 * | 8/2008 | Yarkosky | 375/131 |

(Continued)

FOREIGN PATENT DOCUMENTS

EP 0 957 604 11/1999

(Continued)

OTHER PUBLICATIONS

International Search Report—PCT/US06/028730—International Search Authority. European Patent Office—Nov. 24, 2006.

(Continued)

*Primary Examiner* — Olumide T Ajibade Akonai
(74) *Attorney, Agent, or Firm* — Dmitry R. Milikovsky; Howard H. Seo

(57) ABSTRACT

Systems and methodologies are described that facilitate increasing system capacity in a code-limited WCDMA (e.g., TDD, FDD, . . . ) wireless communication environment. According to one aspect, a larger code space can be defined by introducing multiple code clusters within a sector, wherein each cluster has a unique scrambling code. Codes within a cluster can have orthogonal Walsh sequences that can be assigned to user devices to facilitate communicating over a wireless network and can overlap with codes in another cluster. The unique scrambling code assigned to each cluster can ensure that duplicate Walsh sequences in another cluster in the same sector appear as a pseudo-noise codes.

34 Claims, 9 Drawing Sheets

U.S. PATENT DOCUMENTS

| | | |
|---|---|---|
| 7,423,996 B2 | 9/2008 | Son et al. |
| 7,505,439 B2 * | 3/2009 | Chiang et al. ............. 370/335 |
| 2002/0003786 A1 | 1/2002 | Kim et al. |
| 2003/0112777 A1 * | 6/2003 | Li et al. .................... 370/335 |
| 2003/0202563 A1 | 10/2003 | Das et al. |
| 2004/0071115 A1 * | 4/2004 | Earnshaw et al. ........... 370/335 |
| 2004/0131007 A1 | 7/2004 | Smee et al. |
| 2004/0160920 A1 * | 8/2004 | Bi et al. .................... 370/335 |
| 2004/0179544 A1 * | 9/2004 | Wilson et al. ............... 370/442 |
| 2004/0192315 A1 * | 9/2004 | Li et al. .................... 455/447 |
| 2004/0252665 A1 * | 12/2004 | Clark et al. ................ 370/335 |
| 2005/0030925 A1 | 2/2005 | Salzer |
| 2005/0036461 A1 * | 2/2005 | Keil et al. .................. 370/329 |
| 2005/0226267 A1 * | 10/2005 | Pedersen et al. ............. 370/465 |

FOREIGN PATENT DOCUMENTS

| | | |
|---|---|---|
| EP | 1 396 956 | 3/2004 |
| GB | 2 378 857 A | 2/2003 |
| JP | 7336323 A | 12/1995 |
| JP | 08288927 | 11/1996 |
| JP | 2000031939 A | 1/2000 |
| JP | 200264879 | 2/2002 |
| JP | 2004104790 A | 4/2004 |
| JP | 2005006343 A | 1/2005 |
| RU | 2234196 | 8/2004 |
| RU | 2242819 | 12/2004 |

OTHER PUBLICATIONS

Written Opinion—PCT/US06/028730—International Search Authority, European Patent Office—Nov. 24, 2006.

International Preliminary Report on Patentability—PCT/US06/028730—The International Bureau of WIPO, Geneva, Switzerland—Jan. 22, 2008.

Taiwanese Search report—095126740—TIPO—Jun. 10, 2010.

Translation of Office Action in Japanese application 2008-523044 corresponding to U.S. Appl. No. 11/213,463, citing JP7336323, JP8288927, JP200264879, JP2005006343, GB2378857A, JP2004104790, JP2000031939, US2003202563 and US200471115 dated Jan. 4, 2011.

* cited by examiner

FIG. 5

SDMA FOR WCDMA

CLAIM OF PRIORITY UNDER 35 U.S.C. §119

The present Application for Patent claims priority to Provisional Application No. 60/702,018 entitled "SDMA for WCDMA" filed Jul. 22, 2005 and Provisional Application No. 60/708,230 also entitled "SDMA for WCDMA" filed Aug. 9, 2005, and assigned to the assignee hereof and hereby expressly incorporated by reference herein.

BACKGROUND

I. Field

The following description relates generally to wireless communications, and, amongst other things, to system capacity in a WCDMA wireless communication environment.

II. Background

Wireless networking systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless cellular telephone communication can be split into 30 channels, each of which can carry a voice conversation or, with digital service, carry digital data. Each channel can be assigned to only one user at a time. One commonly utilized variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

Conventional network transmission protocols are susceptible to scheduling limitations and transmission capacity limits, resulting in diminished network throughput. Thus, there exists a need in the art for a system and/or methodology of improving throughput in wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with increasing system capacity in a code-limited WCDMA (e.g., TDD, FDD, . . . ) wireless communication environment. It will be appreciated that any orthogonal or quasi-orthogonal code, including but not limited to Walsh codes, shifted Walsh codes, or some other orthogonal or semi-orthogonal code type, can be employed in conjunction various aspects set forth herein. For purposes of simplicity, and to facilitate understanding of such aspects, systems and methods detailed in this document are described from this point forward with regard to orthogonal Walsh codes. According to one aspect, a larger code space can be defined by introducing multiple code clusters within a sector, wherein each cluster has a unique scrambling code. For example, in a system in which orthogonal Walsh codes are employed, which are conventionally limited to 16 codes (e.g., up to 16 users can be scheduled), N multiple code clusters can be defined to increase the number of available codes, and thus users that can be scheduled, to N*16. Codes within a cluster can have orthogonal Walsh sequences and can overlap with codes in another cluster. The unique scrambling code assigned to each cluster can ensure that duplicate Walsh sequences in another cluster in the same sector appear as pseudo-noise codes.

According to a related aspect, a method of increasing system capacity in a wireless communication environment can comprise assigning a unique scrambling code to a Walsh code cluster having a set of orthogonal Walsh code sequences, and assigning a Walsh code sequence to a user device. Additionally, the method can comprise evaluating spatial signatures for user devices in the sector and determining whether a spatial signal for a first user device is within a predetermined threshold range of a spatial signature for a second user device. Moreover, the method can comprise assigning the first and second user devices to different Walsh code clusters upon a determination that spatial signatures for the first and second user devices are outside the predetermined threshold range, and assigning the first and second user devices to the same Walsh code cluster upon a determination that spatial signatures for the first and second user devices are within the predetermined threshold range.

According to another aspect, a wireless communication apparatus can comprise a memory that stores information related to at least one Walsh code cluster that comprises a set of orthogonal Walsh code sequences, and a processor that assigns a unique scrambling code to the at least one Walsh code cluster, and that assigns a Walsh code sequence to a user device. The memory can store a lookup table comprising information related to Walsh code clusters, Walsh code sequences in each cluster, user device assignments to Walsh code sequences, and unique scrambling codes assigned to each cluster, and the processor can evaluate spatial signatures associated with user devices in the sector and group the user devices into subsets based at least in part on the spatial signatures of the user devices. The processor can then assign subsets of user devices in the sector to a code cluster and can assign each of the user devices in the subset to a different orthogonal Walsh code sequence in the cluster to mitigate interference between user devices in the same cluster.

According to yet another aspect, an apparatus for increasing system capacity in a sector of a wireless communication environment comprises means for generating multiple Walsh code clusters that have a complete set of orthogonal Walsh sequences, means for assigning a unique scrambling code to each Walsh code cluster, and means for assigning user device subsets to Walsh code clusters wherein each user device is assigned at least one orthogonal Walsh sequence in the Walsh code cluster. Additionally, the apparatus can comprise means for evaluating spatial signatures of user devices in the sector, and means for grouping the devices into the subsets based at least in part on spatial signatures there for.

Yet another aspect relates to a computer-readable medium having stored thereon computer-executable instructions for generating multiple Walsh code clusters that have a complete set of orthogonal Walsh sequences, assigning a unique scrambling code to each Walsh code cluster to uniquely identify each cluster, and assigning user device subsets to Walsh code clusters wherein each user device is assigned at least one orthogonal Walsh sequence in the Walsh code cluster. Moreover, the medium can comprise instructions for evaluating spatial signatures for a set of user devices in the sector, and for grouping the user devices into subsets based at least in part on similarities in spatial signatures there for.

Still another aspect relates to a processor that executes instructions for increasing system capacity in a wideband code-division multiple access wireless communication environment, the instructions comprising generating multiple Walsh code clusters that each have a complete set of orthogonal Walsh sequences, assigning user device subsets to Walsh code clusters wherein each user device is assigned at least one orthogonal Walsh sequence in the Walsh code cluster and wherein subsets are generated based at least in part on spatial signatures of the user devices, and assigning a unique scrambling code to each Walsh code cluster to distinguish between Walsh code clusters.

A further aspect sets forth a mobile device that facilitates communicating over a wireless network, comprising a component that receives an assignment of a Walsh code sequence in a Walsh code cluster, a component that recognizes whether the Walsh code sequence in an incoming signal is assigned to the mobile device, and a component that recognizes whether an expected scrambling code associated with the Walsh code cluster is present in the incoming signal, wherein the mobile device disregards as pseudo-noise an incoming signal that does not exhibit both the assigned Walsh code sequence and the expected scrambling code.

Yet another aspect relates to a method of increasing system capacity in a wireless communication environment, comprising assigning user devices with similar spatial signatures to a same Walsh code cluster and assigning user devices with sufficiently different spatial signatures to different Walsh code clusters. The method can further comprise assigning a unique scrambling code to each Walsh code cluster to distinguish between Walsh code clusters.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 5 illustrates a lookup table that can be generated, dynamically updated, and/or stored, in either or both of a user device and a base station, and which comprises information related to Walsh code sequence clusters, user device assignments, and the like, in accordance with various aspects.

DETAILED DESCRIPTION

Figure 1:
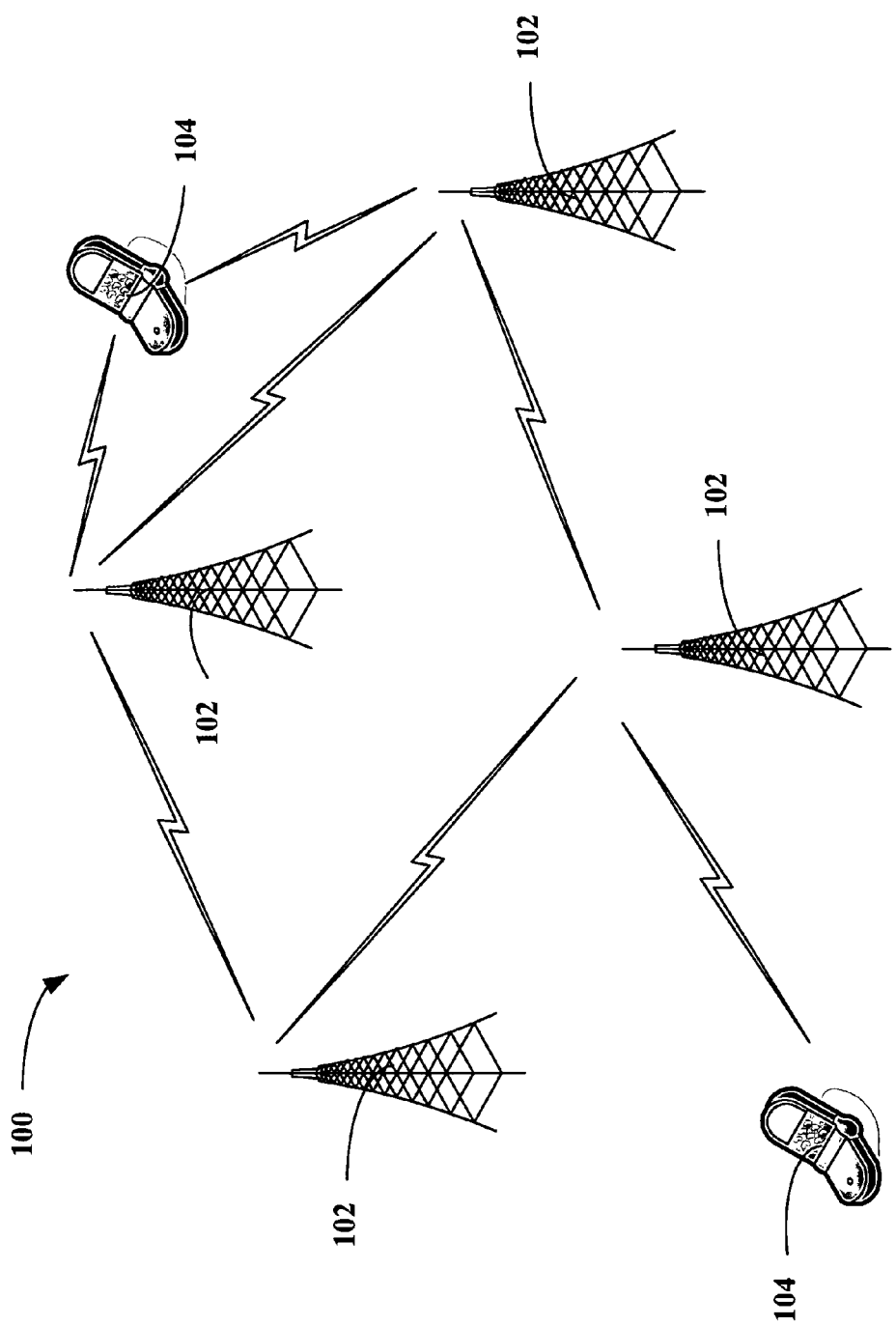
FIG. 1 illustrates a wireless communication system in accordance with various embodiments presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring now to FIG. 1, a wireless communication system 100 in accordance with various embodiments presented herein is illustrated. System 100 can comprise one or more base stations 102 in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless system 100.

WCDMA employs Walsh codes to encode a communication channel in both the forward link (FL) and the reverse link (RL). It will be appreciated that although various aspects set forth herein are described with regard to Walsh codes, any suitable orthogonal or semi-orthogonal code type (e.g., shifted Walsh codes, etc.) can be employed in conjunction therewith, as will be appreciated by one skilled in the art. A Walsh code is an orthogonal code that facilitates uniquely identifying individual communication channels, as will be appreciated by one skilled in the art. Utilization of Walsh codes can limit system dimensions and can limit transmission capabilities when multiple antennas are employed at a base-station for transmit/receive actions. To overcome such limitations associated with conventional systems, space division multiple access (SDMA) can be employed on the forward link (FL) and reverse link (RL) in a WCDMA communication environment. Such techniques are applicable to FL and RL in time division duplex (TDD) and frequency division duplex (FDD) WCDMA environments.

The FL and RL in conventional WCDMA systems utilize Walsh code multiplexing where multiple users are allocated different codes and scheduled simultaneously. In the case of FL, a base station allocates one or more Walsh codes to each user device and transmits simultaneously to the scheduled user devices. In the case of RL, users within a sector are allocated different Walsh codes and are received simultaneously (e.g., using a MAC channel) at the base-station. User devices can be separated at the base station using standard despreading-decoding techniques for CDMA. The number of codes that can be assigned simultaneously is limited by the length of the Walsh code. For example, if the Walsh code is of length N chips, then at a given time up to N codes may be assigned to multiple user devices. This imposes a constraint on the number of codes that may be assigned simultaneously (e.g., a dimension limit). The FL and RL in a typical WCDMA-TDD environment allow Walsh codes of a length of up to 16 chips. Thus, up to 16 user devices can be supported simultaneously in any given slot. This dimension limitation can be detrimental when the base station has multiple receive antennas.

A CDMA system is usually designed to operate in a linear region, such that the capacity-post processing (where the processing includes de-spreading, antenna combining etc) SINR relationship is linear. For example, if the system is operating in the linear region and if the post-processing SINR increases by 3 dB (e.g., doubles) then the capacity (throughput) of the system also doubles. Increasing the number of receive antennas increases post-processing SINR. Therefore, provided the system operates in the linear region, the capacity of the system can be scaled linearly with the number of receive antennas. However, when multiple receive antennas are employed, the increase in post-processing SINR tends to push the system out of the linear region. One way to force the system to remain in the linear region is to increase interference, which can be accomplished by increasing the number of codes supported simultaneously. For example, if the number of receive antennas is doubled, a CDMA system employing pseudo random codes can simply double the number of codes (reducing the transmit power per code by half, in this case, for inter-sector interference control). The reduction in transmit power can be compensated for by the SINR gain associated with the multiple receive antennas. In this manner, scaling with regard to the number of receive antennas in a CDMA system can be achieved. However, in a WCDMA-TDD system with a limited number of codes (e.g., 16), increasing the number of receive antennas will eventually and undesirably push the system out of the linear region, thereby detrimentally affecting system capacity improvement.

Figure 2:
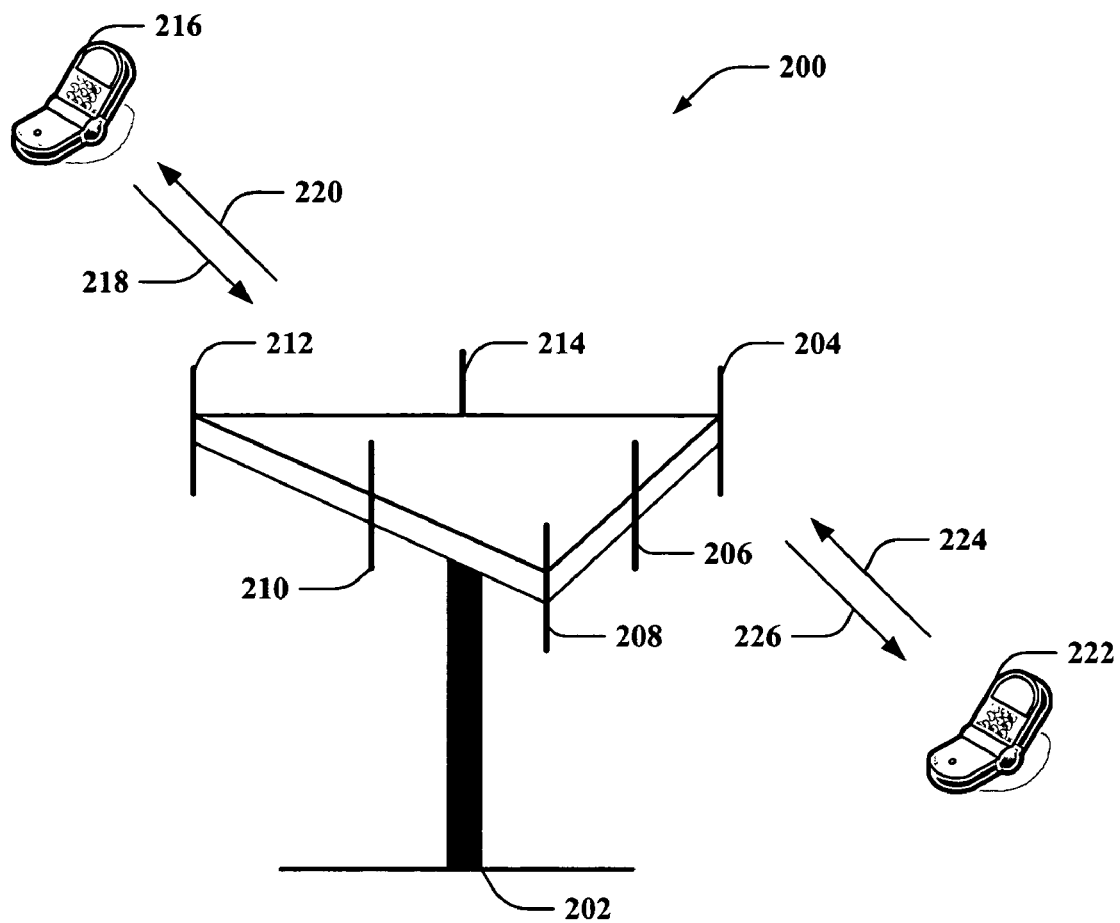
FIG. 2 is an illustration of a multiple access wireless communication system according to one or more embodiments.

Referring now to FIG. 2, a multiple access wireless communication system 200 according to one or more embodiments is illustrated. A 3-sector base station 202 includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 220 and receive information from mobile device 216 over reverse link 218. Mobile device 222 is in communication with antennas 206 and 208, where antennas 206 and 208 transmit information to mobile device 222 over forward link 126 and receive information from mobile device 222 over reverse link 224.

Figure 3:
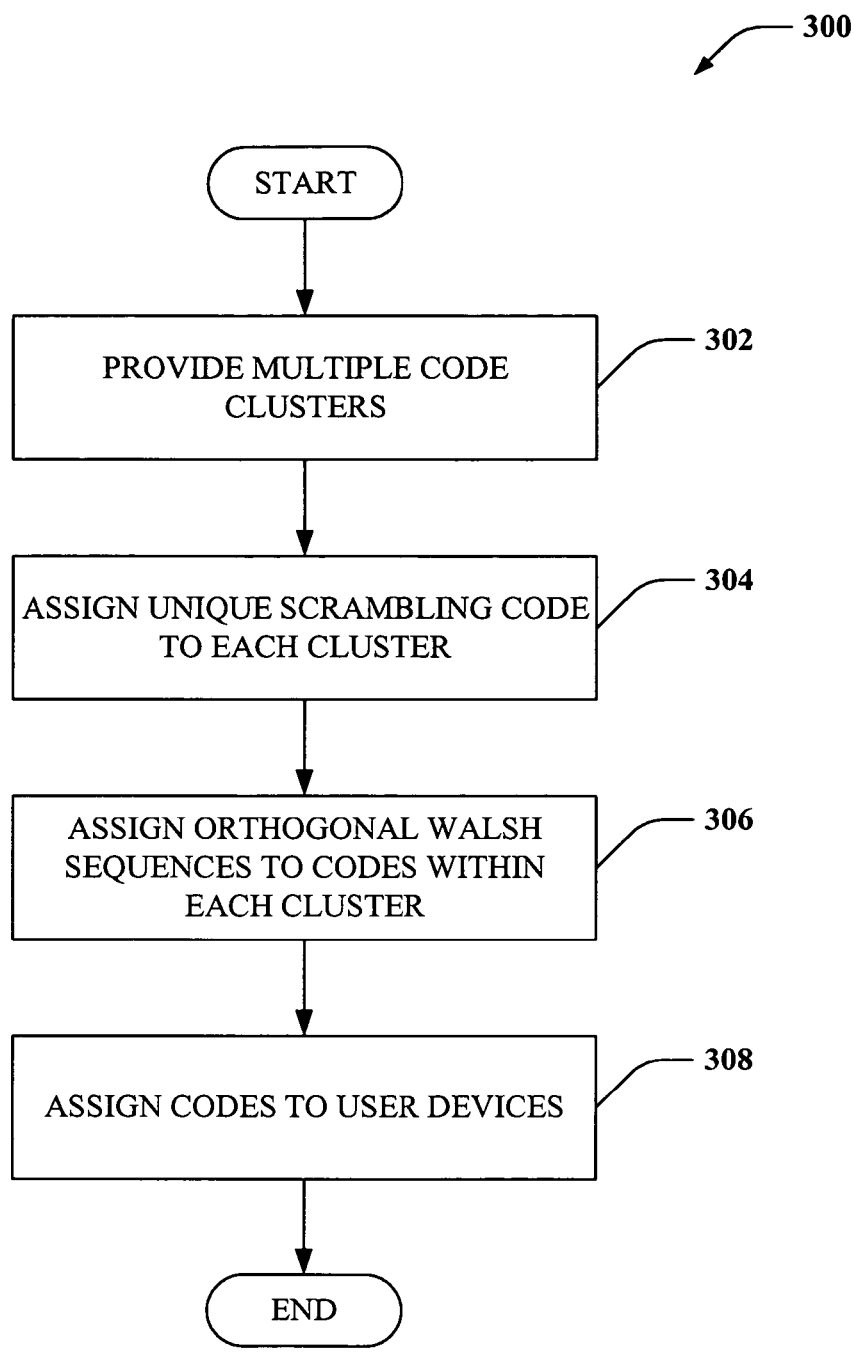
FIG. 3 illustrates a methodology for improving throughput in a wireless communication environment, in accordance with one or more aspects presented herein.
Figure 4:
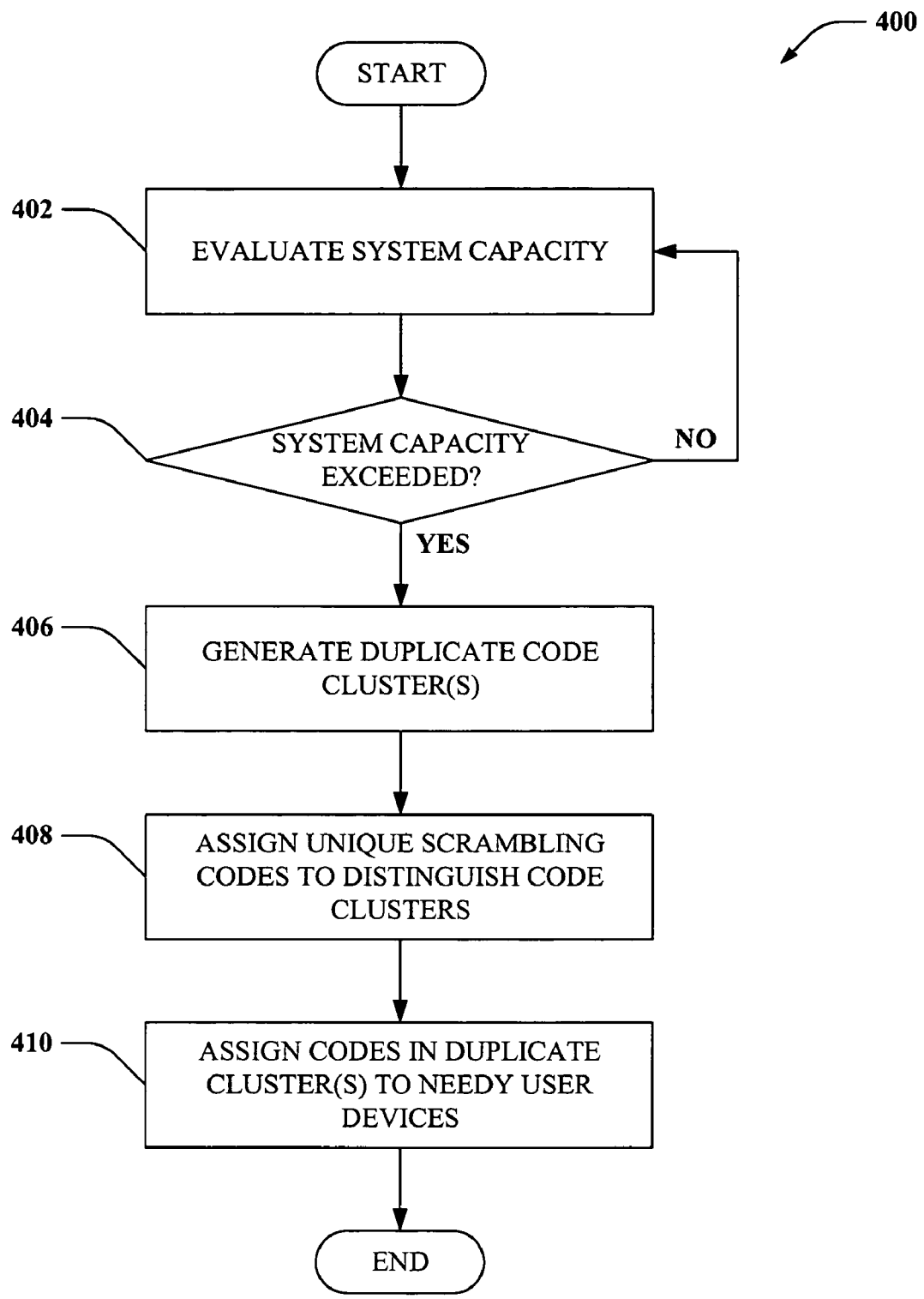
FIG. 4 is an illustration of a methodology for improving communication throughput in a wireless communication environment using a feedback loop to evaluate system capacity, in accordance with various embodiments described herein.

Referring to FIGS. 3-4, methodologies relating to generating supplemental system resource assignments are illustrated. For example, methodologies can relate to providing multiple code clusters in an FDMA environment, an OFDMA environment, a CDMA environment, a WCDMA environment, a TDMA environment, an SDMA environment, or any other suitable wireless environment. Specifically, methodologies set forth herein are described with regard to a wide-band code-division multiple access (WCDMA) wireless communication environment, although other types of communication environments can be utilized in conjunction with the described aspects. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Referring now to FIG. 3, a methodology 300 for improving throughput in a wireless communication environment, in accordance with one or more aspects presented herein is illustrated. As noted above, a drawback of using a WCDMA-TDD system is the dimension limit due to a limited number of codes that can be assigned to users. This in turn limits the potential upper boundary in system capacity when increasing a number of receive antennas to scale the system. In order to combat this limitation, SDMA techniques can be employed to properly exploit the upper boundary in system capacity.

According to an aspect, a larger code space can be defined by introducing multiple code clusters within a sector, at 302. For example, in a scenario in which Walsh codes are assigned to users (e.g., in sets of 16), if two clusters are defined rather than one, 16×2=32 codes (users) can be scheduled simultaneously. At 304, each cluster can be assigned its own unique scrambling code. The scrambling code ensures that the codes (users) within the other cluster (in the same sector) appear as pseudo noise (PN) codes. At 306, the codes within one cluster can be assigned orthogonal Walsh sequences. Such codes can be assigned to user devices at 308. The set of orthogonal Walsh codes assigned to user devices in the first cluster can overlap with codes in the other cluster because clusters are uniquely identifiable by the scrambling code assigned thereto, which can facilitate providing interference averaging.

Additionally, users with similar spatial signatures may be allocated within the same cluster while well-separated users may be allocated across clusters. For example, users have similar spatial signatures can be assigned to a first cluster of orthogonal Walsh codes to ensure that they are assigned sufficiently different codes to mitigate interference there between, while users with disparate spatial signatures can be assigned identical Walsh codes, but in different clusters, with different scrambling codes, because their spatial signatures are unique enough to suggest that communication by such users will not likely interfere with each other. The above techniques may be understood as a method to create interference to facilitate pushing the system into the linear region and retaining the linear scalability of system capacity with the number of receive antennas.

Although the foregoing describes RL communication in a WCDMA-TDD environment, the techniques apply equally well to RL communication in a WCDMA-FDD environment. Additionally, during FL communication, transmit beamforming provides an opportunity for a scaling of system capacity with the number of transmit antennas. Thus, the concepts of supporting larger number of users through appropriate scheduling/code space enhancement are applicable in FL communication as well.

FIG. 4 illustrates a methodology 400 for improving communication throughput in a wireless communication environment using a feedback loop to evaluate system capacity, in accordance with various embodiments described herein. System capacity can be evaluated at 402. For example, if a system employs a limited number of Walsh codes for assignment to user devices in a sector thereof, then such can be determined at 402. At 404, a determination can be made regarding whether system capacity has been exceeded. For instance, in the above example, if the system typically employs a 16-chip set of Walsh codes, then system capacity is at most 16 users, where each user is assigned a single Walsh code for communication. If it is determined at 404 that there are sufficient codes for all users in the sector, the system capacity has not been exceeded and the method can revert to 402 for further iterations of evaluation.

If there are more users than can be handled by the multi-chip Walsh code, then system capacity has been exceeded, and the method can proceed to 406, where duplicate code cluster(s) can be generated. For instance, according to an example, there can be 24 users in a sector, each of which receives a code assignment to be able to communicate. Additionally, the Walsh code for the sector can have a maximum length of 16 chips, which leaves a deficit of 8 codes if all users are to be permitted to communicate. To address this problem, the duplicate code cluster (e.g., duplicate of the 16-chip Walsh code) is generated at 406. The duplicate cluster and the original cluster can each be assigned a unique scrambling sequence at 408, which permits the original to be distinguished from the duplicate. At 410, codes from the duplicate code cluster can be assigned to the 8 users that need code assignments, thus overcoming the deficit determined at 404. In this manner, multiple duplicate chip sets can be generated and uniquely identified to permit scalability and to overcome system capacity limitations associated with conventional CDMA systems. Additionally, it will be appreciated by one skilled in the art that the foregoing example is not limited to a case in which a single duplicate code cluster is generated, but rather that any number of duplicate code clusters can be generated and uniquely identified (e.g., with scrambling codes) to facilitate meeting system demands and to scale the system to the number of users being provided code assignments.

It will be appreciated that, in accordance with one or more embodiments described herein inferences can be made regarding system scaling, code sequence allocation, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 5:
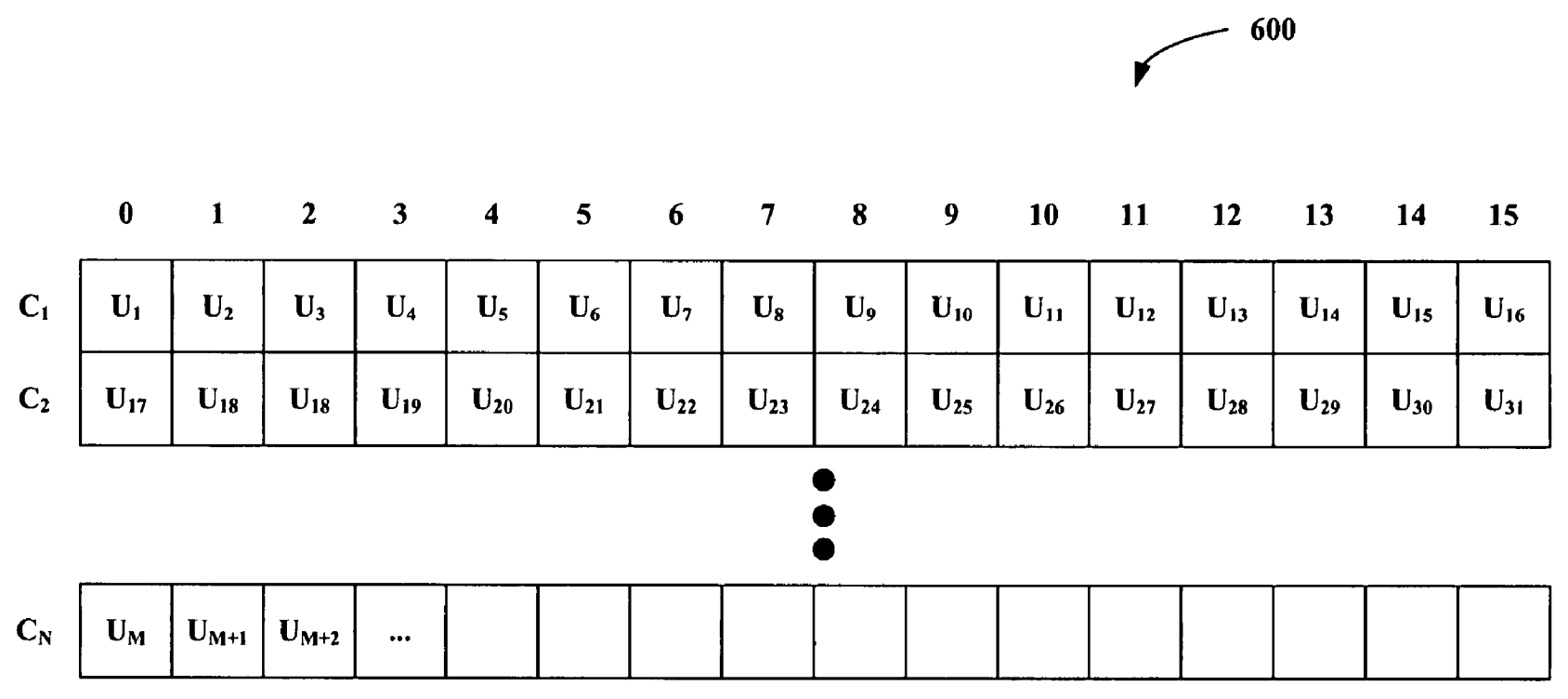

FIG. 5 illustrates a lookup table 600 that can be generated, dynamically updated, and/or stored, in either or both of a user device and a base station, and which comprises information related to Walsh code sequence clusters, user device assignments, and the like. According to the figure, a plurality of code clusters, $C_1$-$C_N$, are provided, each of which comprises 16 code sequences, labeled 0-15, which can be assigned to user devices and by which such user devices can communicate with a receive antenna at a base station, wherein each receive antenna is allocated specifically to a single cluster. Based on spatial signatures associated with user devices $U_1$-$U_{16}$, such devices have been assigned the orthogonal Walsh sequences of cluster $C_1$. It is to be noted that the numbering of the user devices in FIG. 5 is provided to illustrate that each user device is distinct, and that user devices are assigned to sequences in each cluster based on similar spatial signatures. That is, user devices with similar spatial signatures (e.g., geographic positions) can be assigned to the same cluster to ensure that the Walsh code sequences assigned thereto are orthogonal so that such closely positioned user devices do not interfere with one another.

It will further be noted that $U_{18}$ is assigned a pair of Walsh sequences, sequences 1 and 2, in cluster $C_2$. Such assignment can be made where a user device utilizes more than a single Walsh sequence to communicate to the receive antenna for the cluster, and because the spatial signature for $U_{18}$ is sufficiently different from that of $U_2$ and $U_3$ in cluster $C_1$, as well as from that of $U_{M+1}$ and $U_{M+2}$ in cluster $C_N$. That is, due to the relative geographic disparity between user devices in a communication area, such user devices can be assigned identical Walsh sequences, but in different code clusters, such as duplicate code clusters distinguished by unique scrambling sequences and the like.

Figure 6:
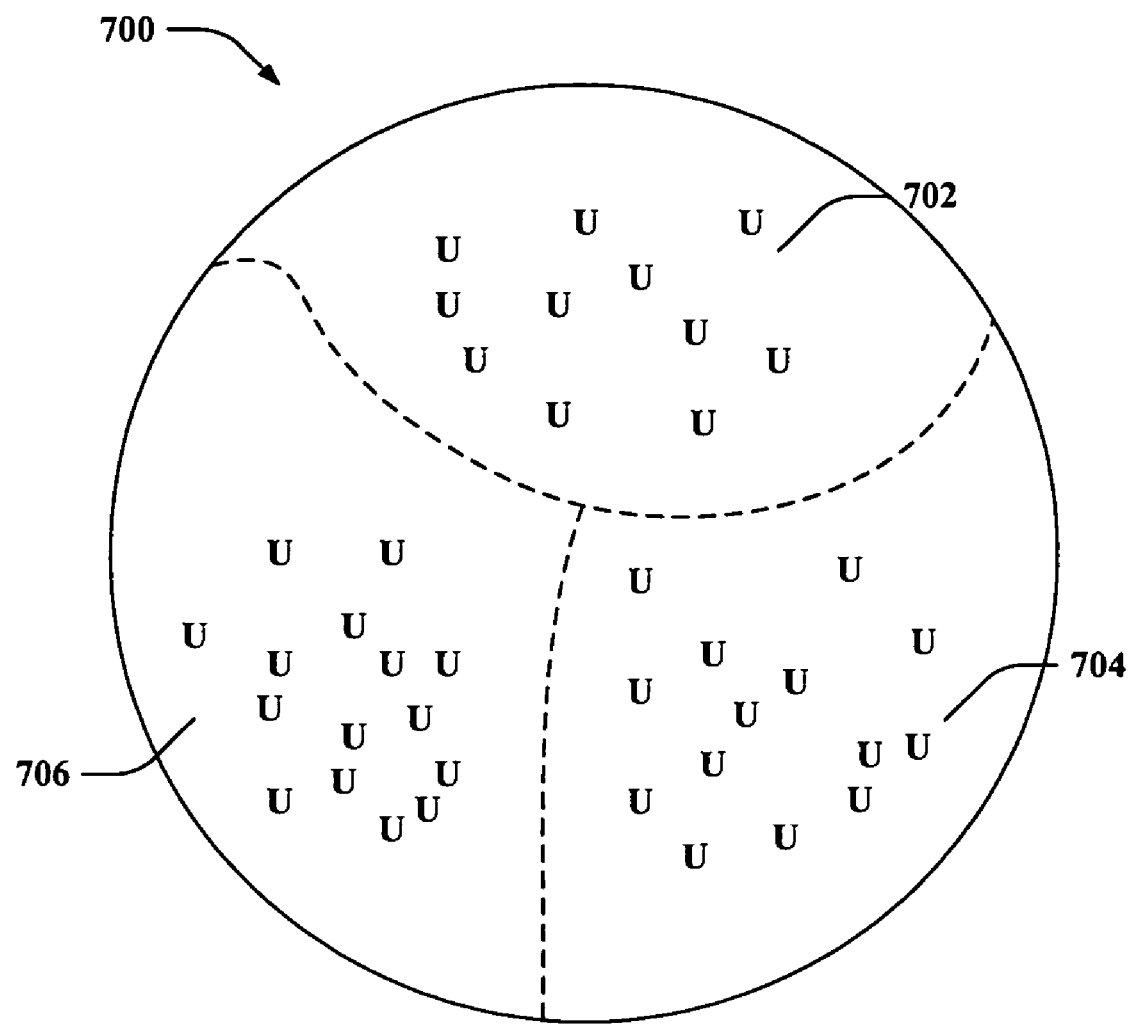
FIG. 6 is an illustration of a wireless communication sector comprising a plurality of users with different spatial signatures, which can be employed to divide the set of all users into spatially distinct subsets, each of which can be assigned to a unique set of Walsh code sequences to facilitate linear scaling of system capacity in a wireless communication environment, in accordance with one or more aspects.

FIG. 6 is an illustration of a wireless communication sector 700 comprising a plurality of users with different spatial signatures, which can be employed to divide the set of all users into spatially distinct subsets, each of which can be assigned to a unique set of Walsh code sequences to facilitate scaling of system capacity in a wireless communication environment. For example, area 700 can be serviced by a base station (not shown) with a plurality of receive/transmit antenna pairs, as described with regard to FIG. 2. A plurality of users communicating within area 700 can be divided into groups using an SDMA technique (e.g., based at least in part on their spatial signatures, etc.). As illustrated, a first group 702 comprises a subset of all users in area 700, all of which have similar spatial features. Group 702 can be assigned a first code cluster comprising a set of orthogonal Walsh codes to facilitate communication signals to be received by a first receive antenna at the base station, wherein the orthogonality of the codes ensures that users within group 702 will not experience inter-group interference. Additionally, it will be appreciated that scaling of system capacity can be performed on the reverse link in a WCDMS-TDD communication environment or in a WCDMA-FDD communication environment. Moreover, on the forward link, beam-forming techniques can be utilized to facilitate scaling of system capacity with the number of transmit antennas.

A second code cluster comprising a plurality of Walsh sequences can be assigned to a second group 704 of users. The second code cluster can comprise a duplicate set of the Walsh sequences assigned to the first user group 702 because the first group 702 and second group 704 are spatially distinct. To mitigate interference between signals transmitted from the first group 702 and the second group 704 where they converge at a base station, unique scrambling codes can be assigned to each code cluster in order to permit a receive antenna to identify and isolate a particular code cluster to which it is assigned. Similarly, such technique can be applied to a third user group 706. It will be appreciated that more or fewer user groups can be defined and duplicate code clusters there for generated. In this manner, sector capacity in a wireless communication environment can be scaled according to a number of users that may be provided service, which in turn can dictate a number of receive antennas that can be allocated to permit multiple code cluster generation to enlarge an aggregate code space over which the users can communicate.

Figure 7:
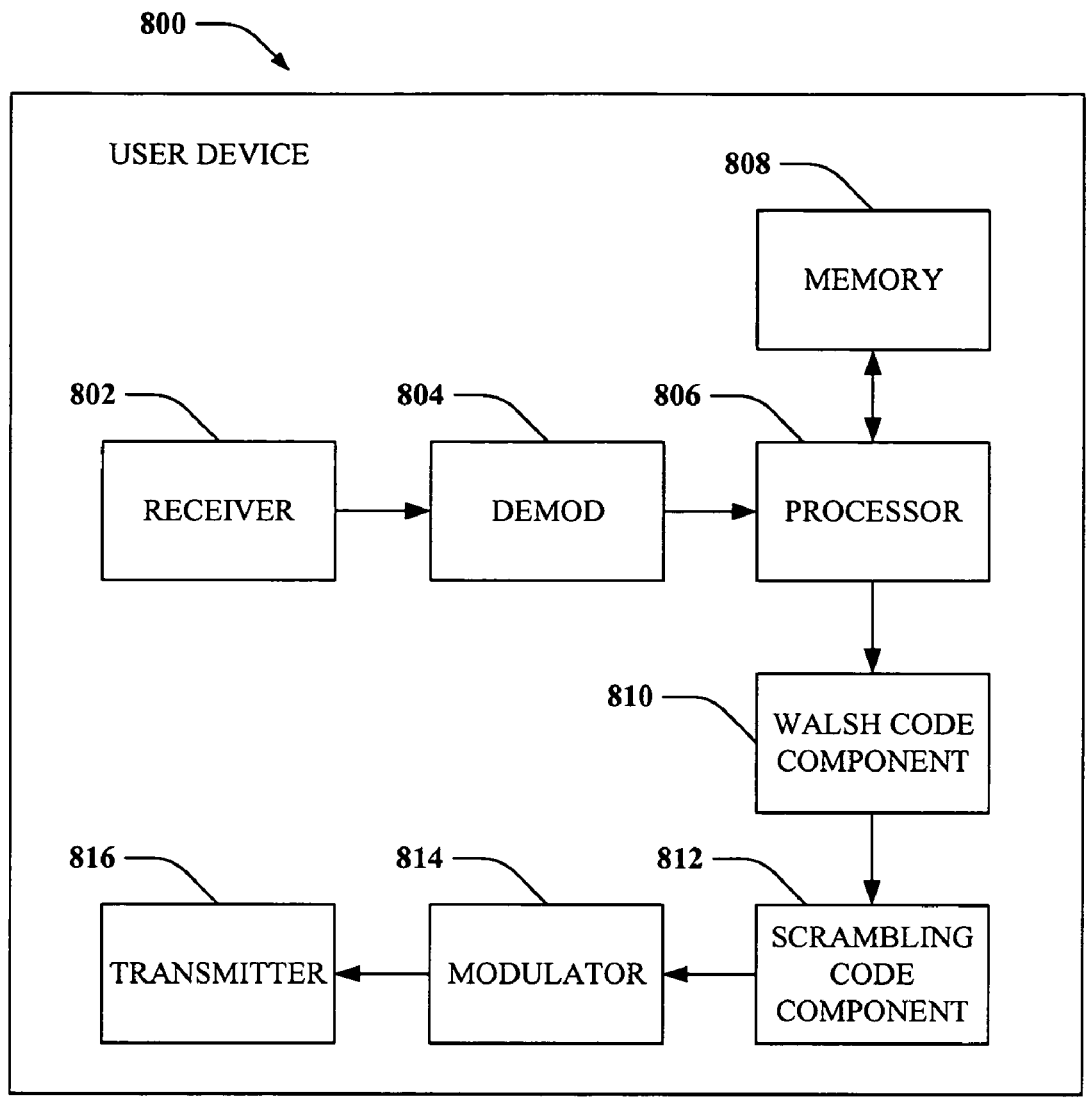
FIG. 7 is an illustration of a system that facilitates defining an enlarged code space in a wireless communication environment to mitigate system capacity limits in accordance with one or more embodiments set forth herein.

FIG. 7 is an illustration of a system 800 that facilitates defining an enlarged code space in a wireless communication environment to mitigate system capacity limits in accordance with one or more embodiments set forth herein. System 800 can reside in a base station and/or in a user device. System 800 comprises a receiver 802 that receives a signal from, for instance a receive antenna, and performs typical actions thereon (e.g., filters, amplifies, downconverts, etc.) the received signal and digitizes the conditioned signal to obtain samples. A demodulator 804 can obtain received symbols for each symbol period, as well as provide received pilot symbols to a processor 806 for channel estimation.

Processor 806 can be a processor dedicated to analyzing information received by receiver component 802 and/or generating information for transmission by a transmitter 816, a processor that controls one or more components of user device 800, and/or a processor that both analyzes information received by receiver 802, generates information for transmission by transmitter 816 and controls one or more components of user device 800.

User device 800 can additionally comprise memory 808 that is operatively coupled to processor 806 and that stores information related to code cluster assignments, Walsh code sequences, lookup tables comprising information related thereto, and any other suitable information related to scaling system capacity linearly with regard to a number of employed receive antennas as described herein. Memory 808 can additionally store protocols associated with generating lookup tables, modulating symbols with Walsh codes, scrambling codes, etc., such that user device 800 can employ stored protocols and/or algorithms to achieve increasing code space in a sector as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 808 is further coupled to a Walsh code component 810 that can generate Walsh code sequence(s) and append such to a communication signal that can be received by a receive antenna allocated to the specific code cluster to which user device 800 is assigned. Because Walsh code clusters can be duplicated to increase code space in a sector, a scrambling code component 812 is operatively associated with Walsh code component 810, which can append a scrambling code unique to the Walsh code cluster to which user device 800 is assigned. The scrambling code can be employed by a base station receive antenna and associated hardware/software to identify user device 800 as belonging to the Walsh code cluster with which the antenna is associated, and the Walsh code sequence appended to the signal transmitted by user device 800 can identify user device 800 to the base station as a specific device in the group of devices associated with the specific Walsh code cluster. User device 800 still further comprises a symbol modulator 814 and a transmitter that transmits the modulated signal with the Walsh code and scrambling code identifiers.

Figure 8:
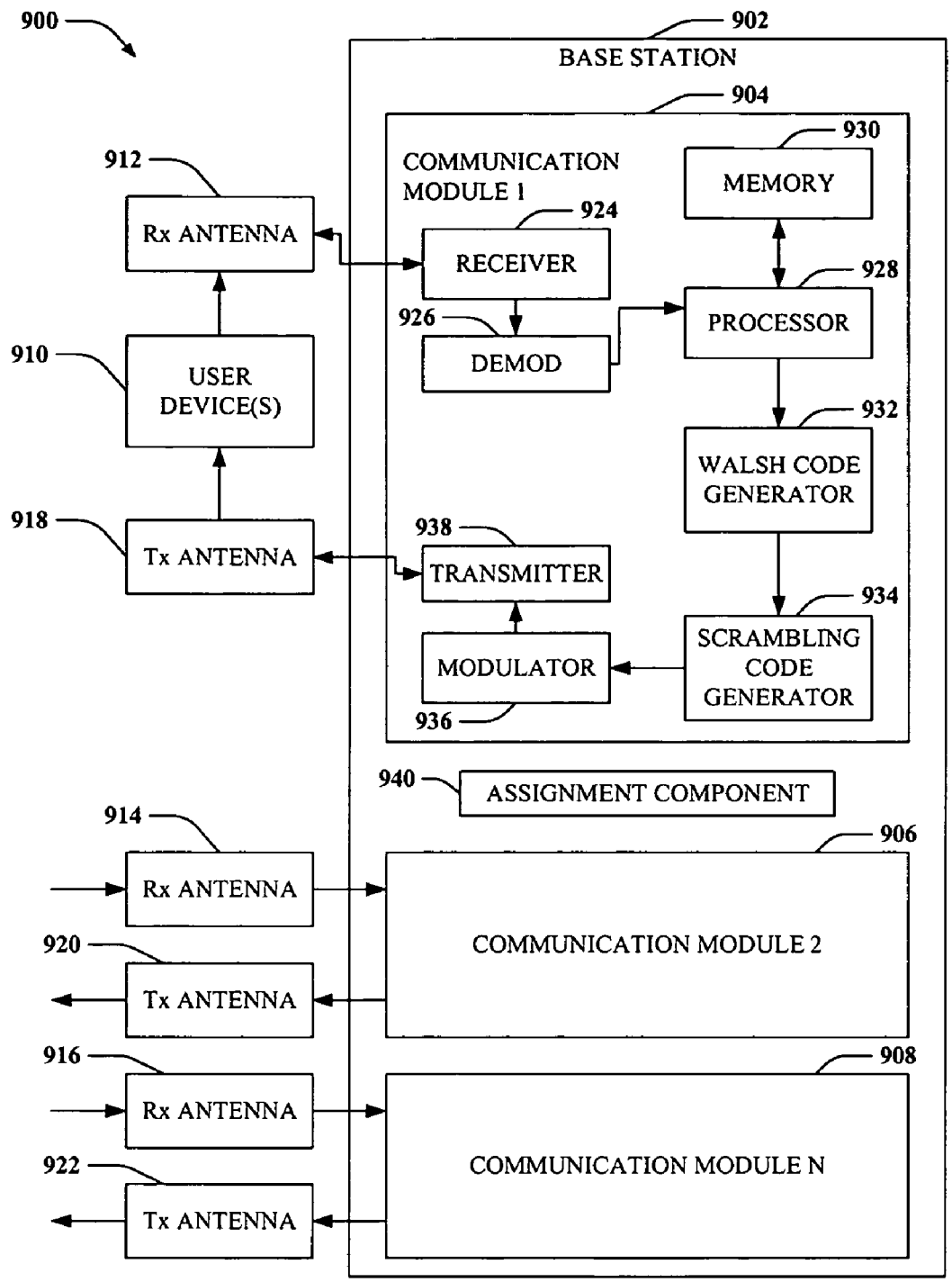
FIG. 8 is an illustration of a system that facilitates increasing code space in a WCDMA communication environment in accordance with various aspects.

FIG. 8 is an illustration of a system 900 that facilitates increasing code space in a WCDMA communication environment in accordance with various aspects. System 900 comprises a base station 902 with a first communication module 904, a second communication module 906, through an Nth communication module 908. It is thus to be understood that base station 902 can comprise any number of communication modules wherein each communication module is associated with a respective antenna pair as set forth in FIG. 2. As illustrated, first communication module 904 receives signal(s) from one or more user devices 910 via a receive antenna 912, and transmits to the one or more user devices 910 through a transmit antenna 918. Similarly, communication module 906 is associated with a receive antenna 914 and a transmit antenna 920, and communication module 908 is likewise associated with a receive antenna 916 and a transmit antenna 922, where the antennas 914, 916, 920, and 922 facilitate communicating with one or more user devices (not shown).

Communication module 904 comprises a receiver 924 that receives information from receive antenna 912 and is operatively associated with a demodulator 926 that demodulates received information. Demodulated symbols are analyzed by a processor 928 that is similar to the processor described above with regard to FIG. 7, and is coupled to a memory 930 that stores information related to code clusters, user device assignments, lookup tables related thereto, unique scrambling sequences, and the like. Processor 928 is further coupled to a Walsh code generator 932 that generates code sequences that can be appended to a signal to uniquely identify an intended user device. Communication module 904 further comprises a scrambling code generator 934 that can append a pseudo-noise code sequence to a signal to uniquely identify the communication module from which the signal is originating. A modulator 936 can multiplex the signal for transmission by a transmitter 938 through transmit antenna 918 to user devices 910.

Base station 902 further comprises an assignment component 940, which can evaluate a pool of all user devices in a sector served by base station 902, and can group user devices into subsets (e.g., such as the subset of user devices 910) based at least in part on the spatial signatures of individual user devices (e.g., using an SDMA technique or the like). For instance, in a WCDMA-TDD or WCDMA-FDD communication environment, Walsh codes can be employed to uniquely delineate one user device from the next, where a user device recognizes only those communication signals that exhibit the user device's Walsh code sequence and transmits a using the same Walsh code sequence to identify itself to a base station. However, conventional WCDMA systems are limited in the number of Walsh codes that can be employed (e.g., typically 16 per sector), thus such systems exhibit an undesirable upper limit with regard to system capacity.

To provide scalability to such WCDMA systems, assignment component 940 can group user devices into subsets according to a number of users that can be supported by a set of Walsh codes. It will appreciated that the assignment component 940 can be a processor, similar or identical to processor 928, that evaluates a set of user devices in a sector, generates subsets of user devices in the sector based at least in part on spatial signatures of the user devices, assigns the subsets to Walsh code clusters and/or communication modules transmitting via the clusters, assigns unique scrambling codes to individual clusters, etc. For instance, all users in a sector can be divided into subsets of 16 or fewer based at least in part on their geographic proximity to each other, and each subset can be assigned to a communication module. Each communication module's Walsh code generator 932 can generate a unique Walsh code sequence for each user device in the communication module's assigned subset. To mitigate any undesired interference between user devices with identical Walsh code sequence assignments, but in different clusters, each communication module's scrambling code generator can add a unique scrambling code to all signals transmitted from the communication module's antenna. In this manner, a user device 910 can recognize a particular scrambling code as being consistent with its assigned communication module 904, as assigned by assignment component 940, and can then determine whether the Walsh sequence with which the signal is transmitted matches the user device's assigned Walsh sequence. If so, the user device can initiate decode and processing of the signal. If not, the signal will appear as pseudo-noise to the user device.

It is to be understood that although the foregoing is described with regard to scaling reverse link system capacity linearly as a number of receive antennas is increased in a TDD and/or FDD WCDMA communication environment, such techniques can be applied to forward link transmission as well using beam-forming and increasing a number of transmit antennas, as will be appreciated by one skilled in the art.

Figure 9:
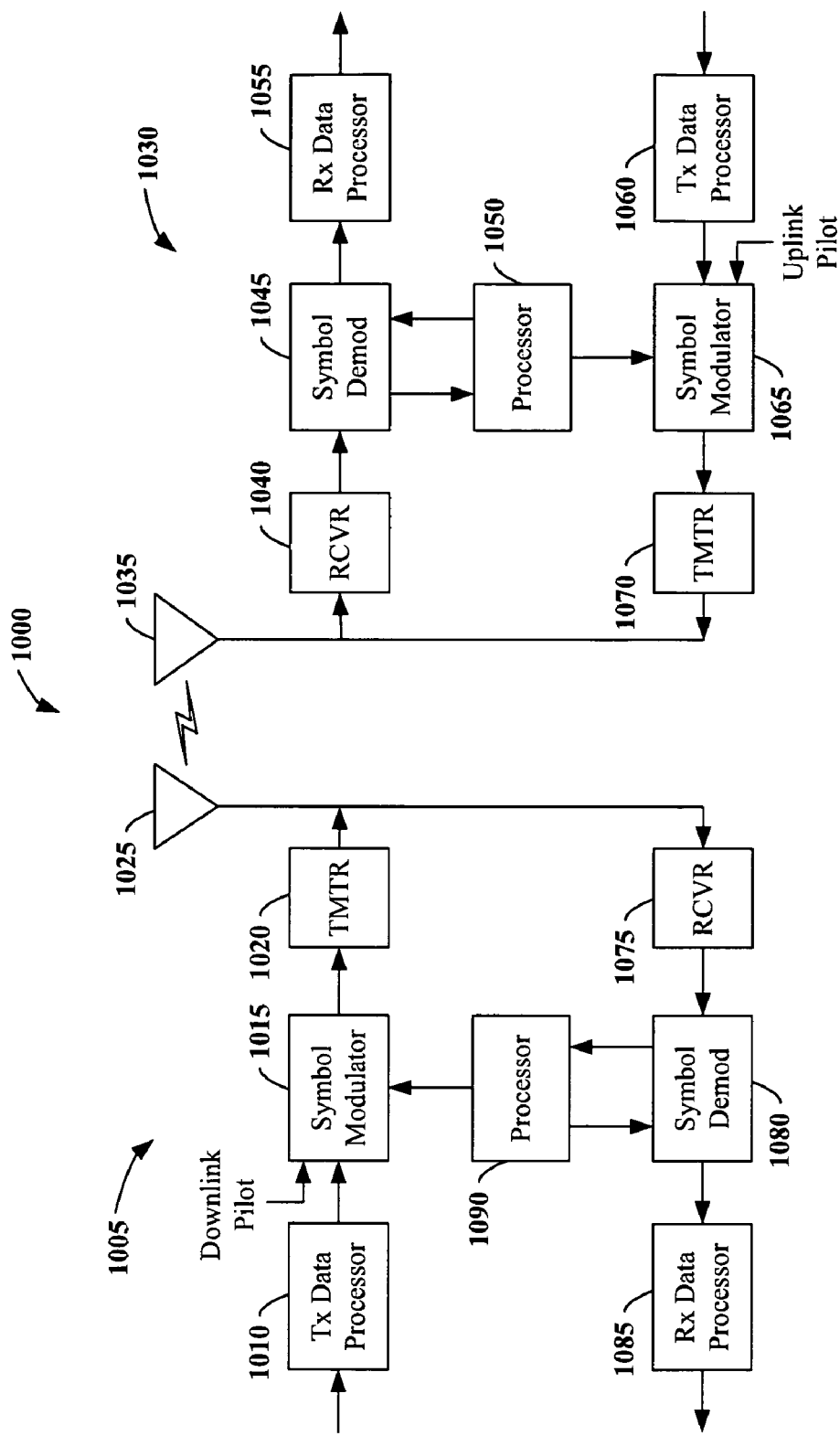
FIG. 9 is an illustration of a wireless communication environment that can be employed in conjunction with the various systems and methods described herein.

FIG. 9 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 7-8) and/or methods (FIGS. 3-4) described herein to facilitate wireless communication there between.

Referring now to FIG. 9, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols on the proper subbands, provides a signal value of zero for each unused subband, and obtains a set of N transmit symbols for the N subbands for each symbol period. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM). In the case of an OFDM system, symbol modulator 1020 can transform each set of N transmit symbols to the time domain using an N-point IFFT to obtain a "transformed" symbol that contains N time-domain chips. Symbol modulator 1020 typically repeats a portion of each transformed symbol to obtain a corresponding symbol. The repeated portion is known as a cyclic prefix and is used to combat delay spread in the wireless channel.

A transmitter unit (TMTR) 1020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. A symbol demodulator 1045 removes the cyclic prefix appended to each symbol, transforms each received transformed symbol to the frequency domain using an N-point FFT, obtains N received symbols for the N subbands for each symbol period, and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol demaps), deinterleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1000.

On the uplink, a TX data processor 1060 processes traffic data and provides data symbols. A symbol modulator 1065 receives and multiplexes the data symbols with pilot symbols, performs modulation, and provides a stream of symbols. The pilot symbols may be transmitted on subbands that have been assigned to terminal 1030 for pilot transmission, where the number of pilot subbands for the uplink may be the same or different from the number of pilot subbands for the downlink. A transmitter unit 1070 then receives and processes the stream of symbols to generate an uplink signal, which is transmitted by the antenna 1035 to the access point 1010.

At access point 1010, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1035. A processor 1090 performs channel estimation for each active terminal transmitting on the uplink. Multiple terminals may transmit pilot concurrently on the uplink on their respective assigned sets of pilot subbands, where the pilot subband sets may be interlaced.

Processors 1090 and 1050 direct (e.g., control, coordinate, manage, etc.) operation at access point 1010 and terminal 1035, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A method for increasing system capacity for a wireless communication environment, comprising:

evaluating whether system capacity has been exceeded, wherein the system capacity is the maximum number N of users with unique Walsh codes of length N chips;

defining a plurality of Walsh code clusters sufficient to meet system requirements when system capacity has been exceeded;

assigning a unique scrambling code to one of the plurality of Walsh code clusters having a set of orthogonal Walsh code sequences which are reused, based upon spatial information; and assigning a Walsh code sequence to a user device.

2. The method of claim 1, further comprising determining whether a spatial signature for a first user device is within a predetermined threshold range of a spatial signature for a second user device.

3. The method of claim 2, wherein the predetermined threshold range is based at least in part on a distance within which the first and second user devices will interfere with each other when assigned identical Walsh codes.

4. The method of claim 1, further comprising assigning a first and second user devices to different Walsh code clusters upon a determination that spatial signatures for the first and second user devices are outside a predetermined threshold range.

5. The method of claim 1, further comprising assigning a first and second user devices to a same Walsh code cluster upon a determination that spatial signatures for the first and second user devices are within a predetermined threshold range.

6. The method of claim 5, user devices within the same Walsh code cluster are assigned orthogonal Walsh code sequences.

7. The method of claim 1, wherein multiple Walsh code clusters are defined as having duplicate sets of orthogonal Walsh codes.

8. The method of claim 1, the wireless communication environment employs a wideband code-division multiple access protocol.

9. A wireless communication apparatus, comprising:
a memory that stores information related to a plurality of Walsh code clusters with at least one Walsh code cluster that comprises a set of orthogonal Walsh code sequences; and
a processor, coupled to the memory, wherein the processor:
a) evaluates whether system capacity has been exceeded, wherein the system capacity is the maximum number N of users with unique Walsh codes of length N chips;
b) defines the plurality of Walsh code clusters sufficient to meet system requirements when system capacity has been exceeded; and
c) assigns a unique scrambling code to the at least one Walsh code cluster, and assigns a Walsh code sequence which is reused to a user device.

10. The apparatus of claim 9, wherein the memory stores a lookup table comprising information related to Walsh code clusters, Walsh code sequences in each cluster, user device assignments of Walsh code sequences, and scrambling codes assigned to each cluster.

11. The apparatus of claim 10, wherein the processor evaluates spatial signatures associated with user devices in the sector and groups the user devices into subsets based at least in part on the spatial signatures of the user devices.

12. The apparatus of claim 11, wherein the processor assigns subsets of user devices in the sector to a code cluster.

13. The apparatus of claim 12, wherein the processor further assigns each of the user devices in a subset to a different orthogonal Walsh code sequence in the cluster to mitigate interference between user devices in the same cluster.

14. The apparatus of claim 10, wherein the processor assigns a unique scrambling code to each cluster to differentiate between clusters.

15. The apparatus of claim 14, wherein the scrambling code is a pseudo-noise code.

16. The apparatus of claim 9, wherein the wireless communication apparatus communicates according to a wideband code-division multiple access protocol.

17. The apparatus of claim 9, wherein the wireless communication apparatus communicates according to at least one of time-division duplexed and frequency-division duplexed communication.

18. An apparatus for increasing system capacity in a sector of a wireless communication environment, comprising:
means for evaluating whether system capacity has been exceeded, wherein the system capacity is the maximum number N of users with unique Walsh codes of length N chips;
means for defining a plurality of Walsh code clusters sufficient to meet system requirements when system capacity has been exceeded;
means for generating the plurality of Walsh code clusters that have a complete set of orthogonal Walsh sequences;
means for assigning a unique scrambling code to each of the plurality of Walsh code clusters; and
means for assigning user device subsets to the plurality of Walsh code clusters, wherein each user device is assigned at least one orthogonal Walsh sequence which is reused in one of the plurality of Walsh code clusters.

19. The apparatus of claim 18 further comprising means for evaluating spatial signatures for a set of user devices in the sector and grouping the user devices into subsets based at least in part on respective spatial signatures.

20. The apparatus of claim 19, further comprising means for scaling the number of Walsh code clusters according to system demand in the sector, such that all user devices are assigned at least one orthogonal Walsh sequence.

21. The apparatus of claim 19, the wireless communication environment employs a wideband code-division multiple access protocol.

22. The apparatus of claim 21, the wireless communication environment is at least one of time-division duplexed and frequency-division duplexed.

23. A non-transitory computer-readable medium having stored thereon computer-executable instructions for:
evaluating whether system capacity has been exceeded, wherein the system capacity is the maximum number N of users with unique Walsh codes of length N chips;
defining a plurality of Walsh code clusters sufficient to meet system requirements when system capacity has been exceeded;
generating the plurality of Walsh code clusters that each have a complete set of orthogonal Walsh sequences;
assigning a unique scrambling code to each of the plurality of Walsh code clusters to uniquely identify each of the plurality of Walsh code clusters; and
assigning user device subsets to the plurality of Walsh code clusters wherein each user device is assigned at least one orthogonal Walsh sequence which is reused in one of the plurality of Walsh code clusters.

24. The non-transitory computer-readable medium of claim 23 further comprising instructions for grouping user devices in the sector into subsets based at least in part on a spatial signature associated with each user device.

25. The non-transitory computer-readable medium of claim 24, further comprising means for scaling the number of Walsh code clusters according to system demand in the sector, such that all user devices are assigned at least one orthogonal Walsh sequence.

26. A processor that executes instructions for increasing system capacity in a wideband code-division multiple access wireless communication environment, the instructions comprising:
- evaluating whether system capacity has been exceeded, wherein the system capacity is the maximum number N of users with unique Walsh codes of length N chips;
- defining a plurality of Walsh code clusters sufficient to meet system requirements when system capacity has been exceeded;
- generating the plurality of Walsh code clusters that each have a complete set of orthogonal Walsh sequences;
- assigning user device subsets to the plurality of Walsh code clusters wherein each user device is assigned at least one orthogonal Walsh sequence which is reused in one of the plurality of Walsh code clusters and wherein subsets are generated based at least in part on spatial signatures of the user devices; and
- assigning a unique scrambling code to each of the plurality of Walsh code clusters to distinguish between each of the plurality of Walsh code clusters.

27. A mobile device that facilitates communicating over a wireless network, comprising:
- a component that evaluates whether system capacity has been exceeded, wherein the system capacity is the maximum number N of users with unique Walsh codes of length N chips;
- a component that defines a plurality of Walsh code clusters sufficient to meet system requirements when system capacity has been exceeded;
- a component that receives an assignment of a Walsh code sequence which is reused in one of the plurality of Walsh code clusters;
- a component that recognizes whether the Walsh code sequence in an incoming signal is assigned to the mobile device; and
- a component that recognizes whether an expected scrambling code associated with one of the plurality of the Walsh code clusters is present in the incoming signal;
- wherein the mobile device disregards as pseudo-noise an incoming signal that does not exhibit both the assigned Walsh code sequence and the expected scrambling code.

28. The mobile device of claim 27, wherein the device is at least one of a cellular phone, a smartphone, a handheld communication device, a handheld computing device, a satellite radio, a global positioning system, a laptop, and a PDA.

29. A method of increasing system capacity in a wireless communication environment, comprising:
- evaluating whether system capacity has been exceeded, wherein the system capacity is the maximum number N of users with unique Walsh codes of length N chips which are reused;
- defining a plurality of Walsh code clusters sufficient to meet system requirements when system capacity has been exceeded;
- assigning user devices with similar spatial signatures to a same Walsh code cluster in the plurality of Walsh code clusters; and
- assigning user devices with sufficiently different spatial signatures to different Walsh code clusters.

30. The method of claim 29, further comprising assigning a unique scrambling code to each of the plurality of Walsh code clusters to distinguish between each of the plurality of Walsh code clusters.

31. The method of claim 29, further comprising defining a predetermined spatial threshold range that delineates spatial boundaries between user devices.

32. The method of claim 31, further comprising assigning user devices to the same code cluster when their spatial signatures are within the predetermined spatial threshold range of each other.

33. The method of claim 31, further comprising assigning user devices to different code clusters when their spatial signatures are not within the predetermined spatial threshold range of each other.

34. The method of claim 33, further comprising permitting assignment of identical Walsh code sequences in different code clusters to user devices assigned to different code clusters.

* * * * *